United States Patent
Fehling et al.

(10) Patent No.: US 12,039,081 B2
(45) Date of Patent: Jul. 16, 2024

(54) METHOD AND ARRANGEMENT FOR PROVIDING DATA FROM AN INDUSTRIAL AUTOMATION ARRANGEMENT TO AN EXTERNAL ARRANGEMENT

(71) Applicant: Siemens Aktiengesellschaft, Munich (DE)

(72) Inventors: Marcus Fehling, Munich (DE); Frank Konopka, Altdorf (DE); Tobias Lamm, Munich (DE); Burkhard Tolks, Nuremberg (DE); Peter Welp, Herbolzheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 282 days.

(21) Appl. No.: 17/623,808

(22) PCT Filed: Jul. 1, 2020

(86) PCT No.: PCT/EP2020/068526
§ 371 (c)(1),
(2) Date: Dec. 29, 2021

(87) PCT Pub. No.: WO2021/001425
PCT Pub. Date: Jan. 7, 2021

(65) Prior Publication Data
US 2022/0245281 A1 Aug. 4, 2022

(30) Foreign Application Priority Data

Jul. 2, 2019 (EP) .................................... 19183899
Jun. 30, 2020 (EP) .................................... 20183028

(51) Int. Cl.
*G06F 21/62* (2013.01)
*G05B 19/418* (2006.01)
(Continued)

(52) U.S. Cl.
CPC ...... *G06F 21/6254* (2013.01); *G05B 19/4185* (2013.01); *G06F 21/44* (2013.01); *G06F 21/64* (2013.01); *G05B 2219/24159* (2013.01)

(58) Field of Classification Search
CPC ...... G06F 21/6254; G06F 21/44; G06F 21/64; G05B 19/4185; G05B 2219/24159
(Continued)

(56) References Cited

U.S. PATENT DOCUMENTS

2018/0014117 A1* 1/2018 Graylin ................. H04R 3/00
2019/0014117 A1  1/2019 Li et al.

FOREIGN PATENT DOCUMENTS

EP  3515035     7/2019
EP  3515035 A1 * 7/2019  ......... G06F 21/6209

OTHER PUBLICATIONS

"CUMULOCITY IoT EDGE"; pp. 1-2, 2018.
(Continued)

*Primary Examiner* — Frantz B Jean
(74) *Attorney, Agent, or Firm* — Cozen O'Connor

(57) ABSTRACT

A method and arrangement for providing data from an industrial automation arrangement to an external application operated in a data cloud and arranged outside a first data network, where an industrial Edge device processes raw data from the data source and makes the processed data available to the external application, the external application transmits a work order to the gateway component, the work order is checked by the gateway component, the raw data are captured and processed according to the work order, and the processed, abstracted and/or anonymized data are provided to the external application or a destination defined in the work order, such that an external user can automatically control access and hence use the data without accessing the underlying raw data because the level of data access is (Continued)

automatically negotiated and produced between the components involved (data source, gateway component) while taking into account requirements and rules.

19 Claims, 2 Drawing Sheets

(51) Int. Cl.
 *G06F 21/44* (2013.01)
 *G06F 21/64* (2013.01)
(58) Field of Classification Search
 USPC .......................................................... 726/26
 See application file for complete search history.

(56) References Cited

OTHER PUBLICATIONS

PCT International Search Report and Written Opinion of International Searching Authority mailed Oct. 5, 2020, corresponding to PCT International Application No. PCT/EP2020/068526 filed Jul. 1, 2020.

* cited by examiner

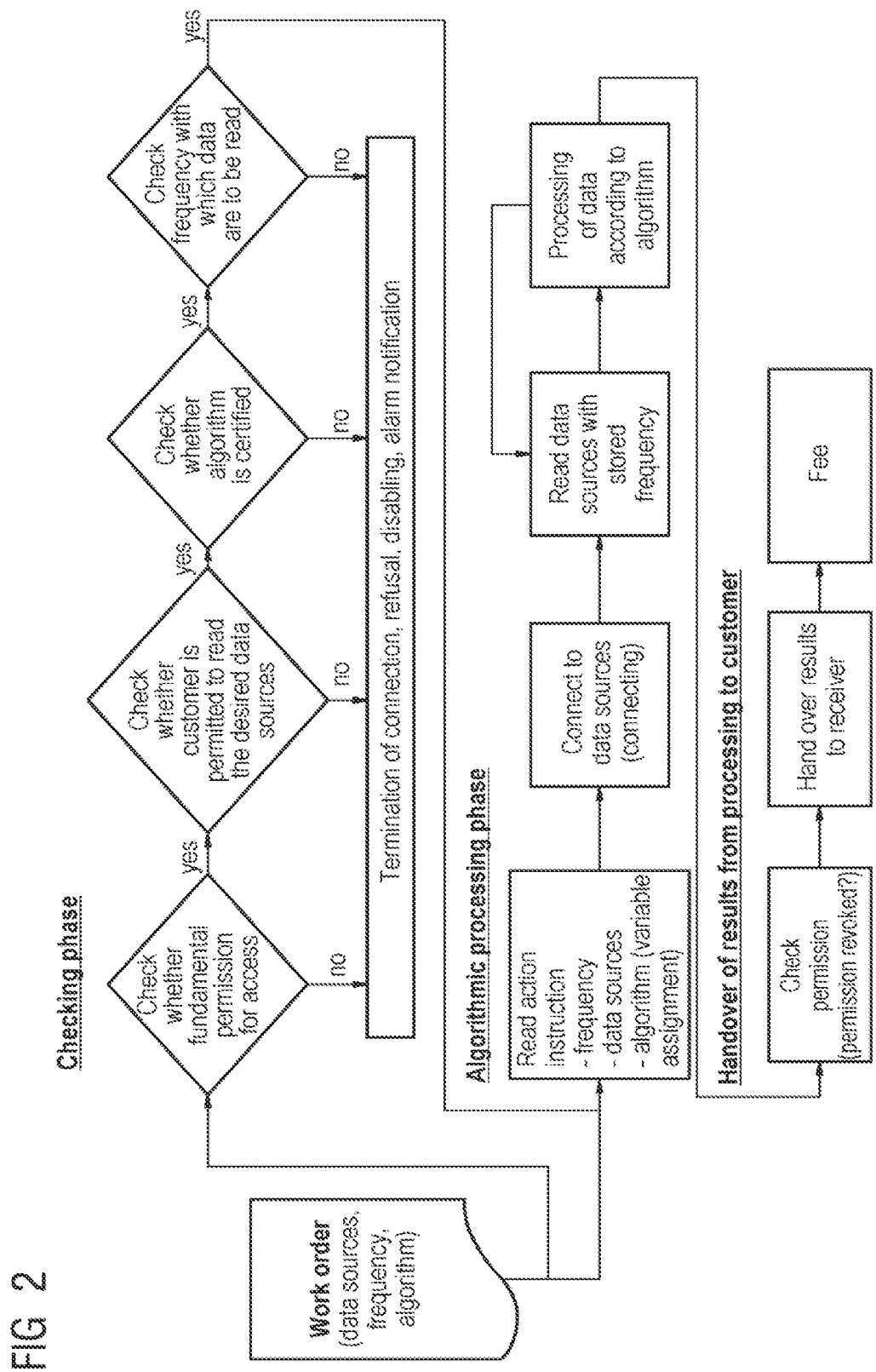

METHOD AND ARRANGEMENT FOR PROVIDING DATA FROM AN INDUSTRIAL AUTOMATION ARRANGEMENT TO AN EXTERNAL ARRANGEMENT

CROSS-REFERENCE TO RELATED APPLICATIONS

This is a U.S. national stage of application No. PCT/2020/068526 filed 1 Jul. 2020. Priority is claimed on European Application Nos. 19183899.4 filed 2 Jul. 2019 and 20183028.8 filed 30 Jun. 2020, the contents of which are incorporated herein by reference in their entirety.

BACKGROUND OF THE INVENTION

1. Field of the Invention

The invention relates to a method for providing data from a data source to an external arrangement, and to an arrangement for providing data from a data source to an external application.

2. Description of the Related Art

Machine data, production data and planning data from an industrial automation arrangement and from other data sources are regularly available in local production networks that are cut off from public networks. They are used there to control and monitor industrial production sequences and processes. Such data regularly also include confidential information, for example about production processes and production methods, financial data, etc., which means that it is undesirable for the information available at the "automation level" to be passed on to external authorities completely. Conversely, direct access from external instances, i.e., devices outside the private automation network, to devices, components, etc., of the private automation network is also often undesirable, or associated with risks.

For this reason, technical measures are customary to isolate the private automation network, i.e., a data source, from public networks, in particular the Internet or a "cloud" ("data cloud"), in a suitable manner. Such a measure can involve the providing a "firewall", for example. This also allows controlled access to be accomplished, for example, a "tunnel" can be established between a device of the private automation network and an external server, which allows private data traffic in or via the public data network (e.g., Internet) to be accomplished in a secure manner.

It is also a known practice to arrange an "Edge device" within the private automation network, or at the "boundary" between the private automation network and the public network, where the device is used firstly to make data processing resources available in the automation network and secondly to make data from the automation network available to an external instance, for example, a cloud-based application or solution, and conversely to receive data and commands from a cloud-based application and to apply them in the private automation network. With respect to the functionality of data provision and transfer, the term "gateway component" is also used generally; this may also be installed on a different component than the "Edge device".

If the operator of the cloud-based, external application and the automation network, or the data source, are either identical or else have a special relationship of trust among one another, such an Edge-device-based solution can be used to consensually plan and produce the data traffic between the automation components of the industrial automation network, or of the industrial automation arrangement, on the one hand, and the external application, on the other.

One problem can be if specific production-related data ("raw data"), i.e., data from the private automation network, are not meant to be available outside the production environment (automation arrangement), but on the other hand an external application requires these data to be available, in order to facilitate business models, optimizations or the like. In this regard, the raw data also include already preprocessed local data, business figures, performance metrics (key performance indicators "KPIs"), etc., of a data source, which are meant to be protected.

Data interchange between private domains and external applications is essential for countless applications, in particular when cloud-based applications are used. Moreover, data are increasingly a commodity today. While access to data and any recompense (fee) can be easily regulated in the case of a pure bilateral relationship between data source and an external application, control of data access is no longer trivial in the case of complex arrangements, because, depending on the external application, other data protection guidelines have to be observed.

As an example, a financial authority may be permitted to access all financial transactions of a company extensively and naturally free of charge. An advertising company can also obtain addresses of customers for advertising purposes from the same stock of data of the company, however, but needs to pay a fee for this. In this case, however, the transactions and the like performed with the customers are not part of the data to be provided. That is, the data access operations by the financial authority have a different scope of permission than those of the advertising business partner. All of the rules, access permissions and restrictions that apply to the data access operations must each be administrated manually, which requires personnel-intensive administration effort.

EP 3 515 035 A1—Schulz "COMPUTER SYSTEM AND METHOD FOR CONTROLLING ACCESS TO DIGITAL DATA OF A DEVICE" discloses control of data access based on meta-information that is associated with the data and that describes a semantic meaning of the data. Permission information, associated with a requester, and the meta-information are used to permit or prevent the data access.

US 2019/0014117 A1 (Li et al.) "SCALABLE AND SECURE RESOURCE ISOLATION AND SHARING FOR IOT NETWORKS" describes the control of data access using authorization tokens that are transmitted to a data source with a request.

SUMMARY OF THE INVENTION

It is an object of the present invention to administrate data access by an external application to a data source in an automated manner.

This and other objects and advantages are achieved in accordance with the invention by an arrangement (component) and method for providing data from a data source, in particular from an industrial automation arrangement, to an external application, where the external application is arranged outside a first data network of the data source, in particular is operated in a data cloud and/or a second data network, and wherein a gateway component, in particular an industrial Edge device, processes raw data from the data source and makes the processed data available to the external application. A first step of the method involves the external application transmitting a work order to the gateway component, where the work order comprises at least details about an identity and/or role of the user of the external application, about the raw data to be processed from the data source, an algorithm for the abstraction and/or anonymization of the raw data and details about a regularity or frequency of the data processing. A second step involves the work order being checked by the gateway component, after which a third step involves the raw data being captured and processed according to the work order. Finally, a fourth step involves the abstracted and/or anonymized data being provided to the external application or to a destination defined in the work order. This provides an external user with the opportunity for automatically controlled access and hence use of the data without it needing to access the underlying raw data. The level of data access is automatically negotiated and produced between the components involved (data source, gateway component) while taking into account requirements and rules.

It is also an object of the invention to provide an arrangement for providing data from a data source, in particular from an industrial automation arrangement, to an external application, where the external application is arranged outside a first data network of the data source, in particular is operated in a data cloud and/or a second data network, and where a gateway component, in particular an industrial Edge device, is configured to process raw data from the data source and to make the processed data available to the external application. The gateway component of the arrangement is configured to use a first step to receive a work order from the external application, where the work order comprises at least details about an identity and/or role of the user of the external application, about the raw data to be processed from the automation arrangement, an algorithm for the abstraction and/or anonymization of the raw data and details about a frequency or regularity of the data processing. A second step is used to check the work order. A third step is used to capture and process the raw data according to the work order, and a fourth step is used to provide the abstracted and/or anonymized data to the external application or to a destination defined in the work order. This component could produce the advantages already discussed on the basis of the method.

In accordance with the invention, a negative check in the second step results in a response message with alternative conditions of the work order being transmitted to the external application, where the external application either confirms or rejects the alternative conditions or uses them to define a new work order. It is thus possible to dynamically and automatically arrange a level of data processing that is suitable for both transaction partners.

In one advantageous embodiment, the work order is accompanied by an offer of recompense for provision of the processed, abstracted and/or anonymized data. This fee can also be negotiated iteratively, like the level of data processing. A fee can certainly be provided in money (or "points" or the like). However, it is also possible for new data (e.g., results, statistics) to be ascertained from the transferred data, where new data is made available to the data source as a quid pro quo.

The algorithm can be checked by a certificate authority, before or during the second step, with respect to whether data protection criteria are met. At the same time, there is also the possibility of an independent check to determine whether the algorithm handles and provides the data in the desired manner. A certificate issued in this case can be assigned to the algorithm or to a standardized work order, a "work order template", in tamperproof fashion. Advantageously, the data protection criteria are cited or transmitted to the certificate authority by the gateway component, as a result of which the data source retains full control over its own data, or raw data. Depending on the transaction partner, i.e., depending on the role and/or identity of the user of the external application, the user can also predefine the guidelines. As such, for example, the aforementioned financial authority can define the raw data to be accessed and the data processing to be provided thereby (if necessary).

Advantageously, the check in the second step takes into account the identity or role of the user of the external application. The identity or role may also have a data access permission, a "trust level", linked to it. Identity, role or trust level can additionally also be proven by certificates.

The work order should be formulated in machine-readable form; this applies to the algorithm in particular. By way of example, there is an opportunity for a data format on an XML or JSON or comparable basis that can contain keywords that can also be read by human beings. In particular, it is thus possible to prepare (templates), configure and check work orders manually.

Advantageously, the algorithm is stored as a model for defining the abstraction of the data of the at least one industrial automation component. This has the advantage that the abstraction of the data can be stipulated by a machine-independent, semantic model. In particular, such a model can be stipulated by a person who has no command of a programming language. Additionally, such models are universally usable and transferable.

Advantageously, the algorithm, or the model contained therein, has an associated machine-readable description, where the description comprises information about the data to be processed (variables, data points, or files) from the data source (e.g., automation component) and about a level or the type of the abstraction of the data by the algorithm or by the model implemented or loaded therein, where execution of the algorithm or of the model is preceded by the description being checked against a policy, where the policy predefines rules about permitted or prohibited access to the data of the data source, or automation component, and/or rules about the required abstraction of the data by the algorithm, and where the algorithm and, if necessary the model contained therein for abstracting the data, is approved for execution only in the event of compliance with the policy.

Such meta-information allows the algorithm or the model implemented therein to be checked, which can also occur automatically or semiautomatically in one advantageous embodiment. Advantageously, this meta-information, i.e., the machine-readable description, which may be available in the form of an XML file, for example, is inseparably added to the algorithm, the work order or the underlying model for defining the abstraction of the data and is also supplied by a provider of the work order (or of a "template"). In particular, it is thus possible to predefine the extent to which raw data need to be abstracted at least. As such, it is, for example, possible to stipulate that, for specific input values, such as operating times of a machine, these data are passed on only in the form of a mean value or a cumulative value for a month. It is thus advantageous if the machine-readable description of the algorithm and a machine-readable description of a policy are compatible in terms of syntax to simplify a comparison, both of manual and of machine-readable type.

Advantageously, the work order or a generic template thereof or at least a model for abstraction of the data that is to be embedded or referenced in the work order or the algorithm is made available via a provision service for industrial applications, in particular an industrial app store. In one advantageous embodiment, this is a similar or even the same app store that also provides applications for an industrial Edge device. This applies in particular in cases in which the work order or even a data processing module for carrying out the work order is formed as an application (app) for the industrial Edge device. In this case, the advantage additionally arises that an industrial Edge device has access to the automation data of the underlying automation components (data source) anyway and can therefore deliver the raw data for processing by the work order, or the algorithm. In particular, an industrial Edge device generally also has communication channels to the "outside", i.e., to an external environment, a "cloud" or the Internet.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the method according to the invention and hence also an exemplary embodiment of the component according to the invention are explained below with reference to the drawings, in which:

FIG. 2 shows a schematic flowchart for the processing of a work order in accordance with the invention.

DETAILED DESCRIPTION OF THE EXEMPLARY EMBODIMENTS

Figure 1:
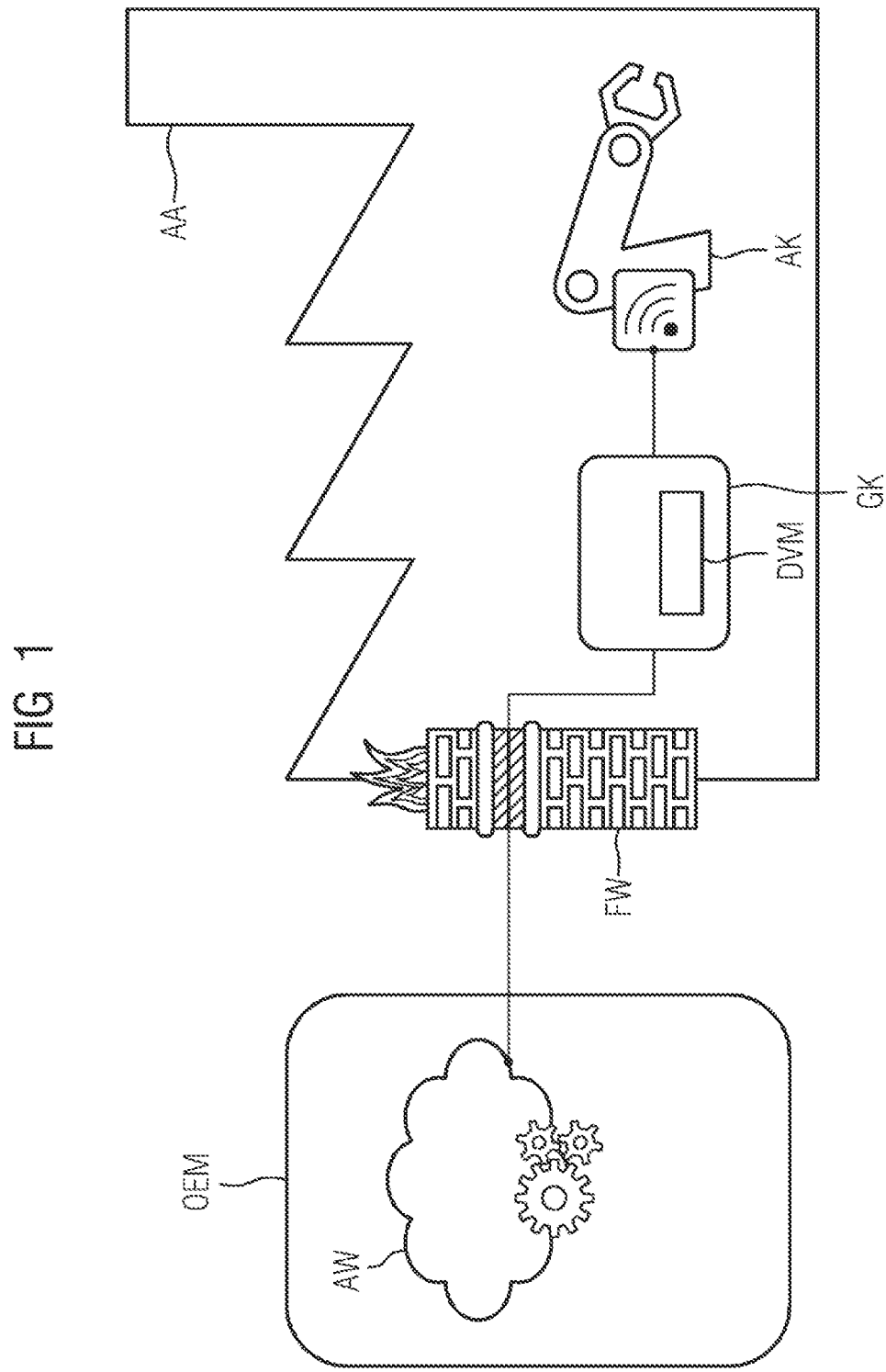
FIG. 1 shows a schematic depiction of an automation arrangement linked to an external application via a gateway component in accordance with the invention.

A common feature of the exemplary embodiments explained below is that a requesting party requires data and—in an advantageous embodiment—offers recompense (e.g., data-driven service, money, return of data, etc.) therefor. If the data have a commercial value, or can be rated, then components that offer and market these data can also be described as "data marketplaces". Commercial data conceal operating secrets and interests worthy of protection. Accordingly, any misuse of the data or unwanted sharing of knowledge must be prevented. It is thus necessary to ensure that, prior to transfer to the data user, the provided data are converted (processed, abstracted, anonymized) from the raw data (original data) such that it is commercially uncritical for the data originator that these data are passed on.

In accordance with the invention, measures are provided that allow the data user and the data originator to be separated such that it is firstly impossible for the data user to infer the causality of the data, and secondly the data are available to the data user in sufficient quality. When the data are used directly, these data are taken as a basis for providing a service from which the originator of the data benefits directly. If the data are used indirectly, then the data user can condition or convert the data further (e.g., by including further data sources) and therefore raise them to a different value chain level, after which it uses them or sells them on.

The central element of this automated data marketplace is the capacity for automated contract negotiation and for monitored contract performance, which requires controlled and monitored provision of data. The core component is an "electronic contract", the nucleus of which is in turn a machine-readable work order. This contains the precise instructions regarding how the parties need to handle the object of negotiation. For this purpose, the technical work order is broken down into three sub-aspects besides the basic data (identities, roles):

1) A description of which data sources of the data originator are needed in order to be able to derive the desired result.
2) A description of how the data provided by the data sources are meant to be processed and in what format the result of the processing is meant to be made available to the data user.
3) Details about the regularity or frequency with which the data are meant to be retrieved from the data sources of the data originator and, independently thereof, the frequency with which the results of the processing are passed on to the data user.

Further details and conditions may naturally also be part of the electronic contract and hence of the work order, such as the period of time over which data are meant to be made available.

The method allows the data user, when requesting data, to make the work order available with its description such that the data originator (owner of the raw data) can consciously decide, prior to processing the work order, whether it wishes to make both the desired data sources and the requested result (e.g., processed or abstracted raw data) available with the stored frequency and also wishes to install the work order locally to itself. After the data originator has shared, the work order is filed in a revision-proof manner. Additionally, the platform implementing the work order logs the activities of the locally proceeding work order, e.g., which data, or raw data, have been received and which data have been made available to the user. This ensures that it is always possible to identify, uniquely and in tamperproof manner, which work order was responsible for the data query, processing, frequency and output. It is therefore always possible for both the data originator and the data user to monitor the activities of the work order and hence compliance with the contract and to spot tampering in good time, or to hamper tampering to the greatest degree.

The level of automation for the contract negotiation is a crucial factor for the extent to which data-driven business models become a successfully scalable business. There is therefore advantageously provision for further mechanisms in order to safely increase the automation further. These mechanisms include, e.g., the possibility of a third, neutral supervisory authority first needing to approve the processing of the data by checking the work order, or the algorithm defined therein, against a likewise machine-readable policy defined by the data originator.

The type of results to be transmitted is tied in a revision-proof manner to the role and rights of the requesting data user (e.g., finance officer, internal customer, external customer, commissioned service provider), which means that one and the same work order can have the output of results restricted. The same mechanism can also be used to ensure that the data originator offers for sale or barter, e.g., via a machine-readable trading center, work orders that are certified by a supervisory authority and therefore safe from the point of view of the data originator.

FIG. 1 shows an industrial automation arrangement AA that, by way of example, is a production site of a manufacturer. Various components such as programmable logic controllers (PLCs), human machine interface (HMI) devices, manufacturing execution systems (MES) and the like are operated in the automation arrangement AA, where only one automation component AK (for example, a machine tool) is shown in FIG. 1 as an example for purposes of clarity. Production data ("raw data") of the automation component AK can be accessed by the gateway component GK, which is an industrial Edge device in the present exemplary embodiment. The gateway component GK can interchange data with an external application AW through a data firewall FW of the automation arrangement AA, where the external application AW is arranged in the data network of a service provider OEM. The connection between the gateway component GK and the external application AW can be made via a data channel on the Internet, for example. The operator of the external application AW, the service provider OEM, is the owner of the automation component AK in this exemplary embodiment.

The method in accordance with the invention is used in this context to facilitate the business model of the service provider OEM that is the owner of the automation component AK. The business model provides for so-called "pay-per-use", that is to say a running-time- and load-dependent fee model for use of the machine. It should be pointed out that although the service provider OEM is a machine manufacturer in the present example, it may also be another, "nonindustrial" service provider OEM (such as banks, insurance companies, and/or maintenance service providers) or even an authority in other examples. It is thus possible for the service provider OEM (as described in the next paragraph) to be the owner of the automation component, but it does not necessarily have to be.

The manufacturer, or service provider OEM, based in an external network requires appropriate information for billing for and servicing the machine, the automation component AK. However, according to the requirements of the user, i.e., the operator of the automation arrangement AA, these data are meant to be available in a form that allows no production details to be inferred. Direct access to the raw data is thus impossible.

For this purpose, the service provider OEM defines an algorithm for data preprocessing that preprocesses the raw data from the industrial setting and abstracts the data such that only information absolutely required for providing the business model or service is transmitted to its data processing and bookkeeping. To this end, the service provider OEM (manufacturer of the machine) defines a model for abstraction of the data that, by way of example, is available in a domain-specific language, a database query language (e.g., SQL), through a conventional computation program (e.g., Matlab from the provider The Mathworks) or the like. Here, it is important that both the data access to the production data (raw data) of the automation component AK and the data processing (abstraction) can be modelled.

Advantageously, such querying and preprocessing (abstraction) of the data, i.e., the model, is encapsulated, for example, in a processing block (container), i.e., delivered with executable program code. Here, it is important that integrity, authenticity and protection of know-how are assured, meaning that both the concerns of the service provider OEM and the concerns of the operator of the automation arrangement AA can be sustainably taken into account. Advantageously, the processing block that contains the model for defining the abstraction of the data and the model for accessing the data is thus certified and, in another advantageous embodiment, also encrypted.

The algorithm or, as in this case, the encapsulated processing block is an important part of a new work order that is transmitted to the gateway component GK. The work order thus contains not only the actual algorithm but also a machine-readable description, "meta-information" for what happens with the raw data, and regulations about the frequency of the data processing, etc. The algorithm is certified in this case, with the result that a certificate from an independent inspection body is included, where the certificate proves that the algorithm does precisely what is described in the meta-information. Additionally, the identity and role of the requesting party are recorded.

The work order is checked by the gateway component GK.

FIG. 2 shows a possible flowchart for the checking and processing of the work order. The work order is checked in a first phase (checking phase) with regard to various criteria of the policy. The raw data are obtained and processed in the algorithmic processing phase.

In the present embodiment, the work order has an appended description, as "meta-information", in the form of an extended mark-up language (XML) file that both defines the raw data accessed and describes the abstraction of the raw data, and specifies the output parameters of the data processing, or data abstraction, accomplished thereby. In the present exemplary embodiment, the operator of the automation arrangement AA has defined a policy, which is likewise available in the form of an XML file. This policy, separately for each identity or role of a "data sink", both defines those data points for obtaining the raw data that can be accessed and predefines the form and frequency in/with which these data need to be processed, i.e., a minimum degree of abstraction. In the present exemplary embodiment, this policy specifies that a work order with the identity or role of the operator OEM can access operating times, maximum torques of a drive of the automation component AK and alarm notifications. The policy additionally stipulates that alarms can be passed on only without timestamps, that operating times can be passed on cumulatively for a month, and that torque values of a drive can be passed on only with regard to the regularity with which a specific torque ("overload") is reached. The policy and the meta-information of the processing block can thus be automatically compared against one another, with the result that the work order can be automatically checked and approved or rejected or renegotiated.

During performance, the gateway component GK, or the data processing module (the runtime environment), in which the work order is performed accesses the basically confidential machine data of the automation component AK. In the present exemplary embodiment, the data to be passed on that are ascertained are the information that the user has used the machine within the terms agreed in the contract. In return, the "fee" provided for making the data available is electronic approval information that is transmitted to the machine, as a result of which further use is allowed. Otherwise, the machine would be disabled for further use.

If, for example, the frequency of transfer of the use data that is required in the work order violates the internal policy of the gateway component, then the work order can receive in response an electronic rejection that comprises the statement "prohibited frequency of access to operating data". It is then possible, likewise fully automatically, for a new work order having a lesser requirement for the frequency to be created and transferred. The systems involved can therefore negotiate an acceptable work order among one another within specified rules and boundaries.

In an embodiment, planning data or other local data of any type can also be accessed if this is necessary in order to perform the service of the external application AW. This means that it is also possible for the data of multiple industrial components to be combined with one another.

Instead of the exemplary embodiment of the "pay-per-use" application shown here, the method and the component (processing block) outlined here can also be used for predictive maintenance, residual value determination (e.g., for tax amortization), for a calculation of insurance risks or the like. The service provider OEM may thus also be a bank, an insurance company, a company for maintenance services or another "data consumer".

While the industrial automation arrangement AA is in operation, the processing block in the data processing module DVM now regularly (e.g., cyclically) captures the raw data of the automation component AK that are defined in the abstraction model, logs them and processes them according to the defined abstraction. The processed data are then made available to the application AW via a data connection.

An essential aspect is that the gateway component GK forms a standard, multifunctional access point for the private raw data, which allows different work orders to be checked, if necessary renegotiated and performed on a role- and/or identity-dependent basis. It is thus essential that a "handshake method" is used to perform a prior check on the admissibility of the query using a machine-readable description of the data processing, and if necessary to perform a query regarding the identity and role of the querying party.

Another work order can relate to the transmission of turnover figures to a financial authority, which ascertains a taxation therefrom. Such a work order, which is digitally signed by a certificate from the authority, thus comprises a definition relating to turnover or financial data that are meant to be transferred with a prescribed frequency (here: hourly). Turnover figures cumulated according to type of goods are meant to be ascertained here. This is defined in the algorithm of the work order.

According to the diagram from FIG. 2, the work order is first of all checked. First of all, it is established that turnover figures fundamentally belong to the permitted raw data. A check is then performed to determine whether the customer, i.e., a person linked to the requesting application or to the work order, has access permission for the requested data sources and hence for the raw data that are to be processed. This permission may be stored for known customers; alternatively, a certificate or the like therefor may be connected to the work order. In an embodiment, the permission may also alternatively or additionally be associated on a role basis. Next, a check is performed to determine whether the work order as a whole, or at least the algorithm to be applied to the raw data, is certified. If not, as an alternative to refusing the work order, the work order can also be transmitted to a certificate authority for checking; this intermediate step is not shown in FIG. 2, however. Finally, a check is performed to determine whether the frequency of access to the raw data and/or the cycle frequency of performance of the work order, or of the included algorithm, is acceptable. If one of the checks has a negative outcome (each "no" in FIG. 2), the work order is refused or "escalated" in a previously defined manner.

After the checking phase, the work order is processed, to which end the referenced data source is accessed to the required extent and the raw data obtained are processed. Finally, the results are transmitted to the customer, and in particular work orders that run for longer can result in a check being performed to determine whether the permission is still available. In the present exemplary embodiment, this means that a cumulative turnover value is ascertained for each group of goods from the turnover figures hourly and reported to the financial authority.

Any previously arranged fee or recompense can then be provided.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing data from a data source, in particular from an industrial automation arrangement to an external application arranged outside a first data network of the data source, a gateway component processing raw data from the data source and making the processed data available to the external application, the method comprising:
    transmitting, by the external application, a work order to the gateway component, the work order comprising at least details about an identity and/or role of the user of the external application, about the raw data to be processed from the data source, an algorithm for the abstraction and/or anonymization of the raw data and details about a regularity or frequency of the data processing;
    checking the work order by the gateway component;
    capturing and processing the raw data in accordance with the work order; and
    providing the abstracted and/or anonymized data to one of (i) the external application and (ii) a destination defined in the work order;
    wherein a negative result of said check of the work order causes transmittal of a response message with alternative conditions of the work order to the external application which one of (i) confirms the alternative conditions, (ii) rejects the alternative conditions and (iii) utilizes the alternative conditions to define a new work order.

2. The method as claimed in claim 1, wherein the work order is accompanied by an offer of recompense for providing the abstracted and/or anonymized data.

3. The method as claimed in claim 1, wherein the algorithm is checked by a certificate authority, before or during said checking of the work order, with respect to whether the data protection criteria are met.

4. The method as claimed in claim 3, wherein the data protection criteria are cited or transmitted to the certificate authority by the gateway component.

5. The method as claimed in claim 1, wherein said checking of the work order takes into account an identity or role of the user of the external application.

6. The method as claimed in claim 1, wherein the work order or at least the algorithm is made available via a service for providing industrial applications.

7. The method as claimed in claim 6, wherein the service for providing industrial applications comprises an industrial app store.

8. The method as claimed in claim 6, wherein the gateway component comprises an industrial Edge device.

9. An arrangement for providing data from a data source to an external application arranged outside a first data network of the data source, the arrangement comprising:
   a gateway component configured to process raw data from the data source and to make the processed data available to the external application;
   wherein the gateway component is further configured to:
      receive a work order from the external application, the work order comprising at least details about an identity and/or role of the user of the external application, about the raw data to be processed from the automation arrangement, an algorithm for the abstraction and/or anonymization of the raw data and details about a frequency or regularity of the data processing;
      check the work order;
      capture and process the raw data according to the work order; and
      provide the abstracted and/or anonymized data to the external application or to a destination defined in the work order;
   wherein the gateway component is further configured to:
      respond to a negative check of the work order by transmitting a response message with alternative conditions of the work order to the external application; and
      wherein the external application is configured to one of (i) confirm the alternative conditions, (ii) reject the alternative conditions and (iii) define a new work order.

10. The arrangement as claimed in claim 9, wherein the work order comprises an offer of recompense for providing the abstracted and/or anonymized data.

11. The arrangement as claimed in claim 9, further comprising:
   a certificate authority configured to check the algorithm, before or during said check of the work order, with respect to whether the data protection criteria are met.

12. The arrangement as claimed in claim 10, further comprising:
   a certificate authority configured to check the algorithm, before or during said check of the work order, with respect to whether the data protection criteria are met.

13. The arrangement as claimed in claim 11, wherein the gateway component is further configured to cite or transmit the data protection criteria to the certificate authority.

14. The arrangement as claimed in claim 9, wherein said the check of the work order takes into account an identity or role of a user of the external application.

15. The arrangement as claimed in claim 9, further comprising:
   a service for providing industrial applications, the service being configured to provide a number of prepared work orders or at least one prepared algorithm for retrieval.

16. The arrangement as claimed in claim 15, wherein the service comprises an industrial app store.

17. The arrangement as claimed in claim 9, wherein the data source comprises an industrial automation arrangement.

18. The arrangement as claimed in claim 9, wherein the external application is operated in at least one of a data cloud and a second data network.

19. The arrangement as claimed in claim 9, wherein the gateway component comprises an industrial Edge device.

* * * * *